3,632,853
CERTAIN BENZOCYCLOHEPTOXAZOLE COMPOUNDS
Eugene E. Galantay, Morristown, N.J., assignor to Sandoz-Wander, Inc., Hanover, N.J.
No Drawing. Division of application Ser. No. 691,171, Dec. 18, 1967, now Patent No. 3,408,360, which is a continuation-in-part of applications Ser. No. 591,980, Nov. 4, 1966, and Ser. No. 645,471, June 12, 1967. Divided and this application June 19, 1968, Ser. No. 807,138

Int. Cl. C07d 85/48

U.S. Cl. 260—307 D          19 Claims

---

ABSTRACT OF THE DISCLOSURE

The compounds are of the class 2-lower alkyl-6H-benzo[3,4]cyclohepta[1,2-d]oxazoles which are substituted at the 4-position by either a bromo, chloro or oxo function, and are useful as anti-depressants and diuretics, respectively, e.g. 2-methyl-4-chloro-6H-benzo[3,4]cyclohepta[1,2-d]oxazole and 2-methyl-5,6-dihydro-4H-benzo-[3,4]cyclohepta[1,2-d]oxazol-4-one. Other compounds are 4-oxo and 4-(3-monoalkyl-and-dialkyl-aminopropylidene) - 2-lower alkyl-9,10-dihydro-4H-benzo-[5,6]cyclohepta[1,2-d]oxazoles.

---

This application is a division of copending application Ser. No. 691,171, filed Dec. 18, 1967, now U.S. Patent 3,408,360, which in turn is a continuation-in-part of copending applications Ser. No. 591,980 filed Nov. 4, 1966 and Ser. No. 645,471, filed June 12, 1967 both of which are now abandoned.

This invention relates to tricyclic compounds. In particular the invention pertains to benzocycloheptaoxazoles and methods for preparing the same. The invention also relates to intermediates which are useful in preparing the above compounds and processes for preparing said intermediates.

The benzocycloheptaoxazoles of the present invention may be represented structurally as follows:

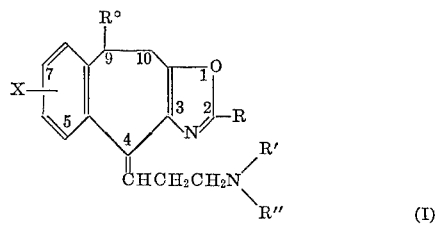

(I)

wherein

R represents lower alkyl, preferably containing from 1 to 4 carbon atoms, e.g., methyl, ethyl, propyl, isopropyl and butyl;

R' represents hydrogen or lower alkyl, preferably containing from 1 to 4 carbon atoms, e.g., methyl, propyl, ethyl and butyl;

R" represents lower alkyl, preferably containing from 1 to 4 carbon atoms, e.g., methyl, ethyl, propyl and butyl;

R° represents hydrogen or phenyl; and

X represents hydrogen or halo, preferably having an atomic weight of 35 to 80, i.e., bromo or chloro.

The compounds of structural Formula I wherein R' is lower alkyl, i.e. compounds Ia, are prepared by first treating 6-isonitroso-6,7,8,9-tetrahydro-5H-benzocyclohepten-5-one or an appropriately substituted derivative thereof with an appropriately suitable acylating agent in the presence of an HZ acid to form the corresponding 2-lower alkyl - 9,10 - dihydro-4H-benzo[5,6]cyclohepta[1,2-d]-oxazol-4-one, i.e. a tricylic ketone (IV); the HZ acid being a hydrohalic acid wherein Z is a halogen having an atomic weight of from 35 to 127. Alternatively, the tricyclic ketone (IV) can be prepared by treating the benzocyclohepten-5-one with the acylating agent in the absence of HZ to form the corresponding 6-alkanoyl-oxyimino-6,7,8,9-tetrahydro-5H-benzocyclohepten - 5 - one (III) which in turn is then treated with an acylating agent and HZ. The 2-lower alkyl-9,10-dihydro-4H-benzo[5,6]cyclohepta[1,2-d]oxazole-4-one (IV) is then treated with an organo-metallo- dialkylaminopropyl halide Grignard reagent and the resulting Grignard adduct hydrolyzed to form the corresponding 2-lower alkyl-4-hydroxy-4-(3-dialkylaminopropyl) - 9,10 - dihydro-4H-benzo[5,6]cyclohepta[1,2-d]oxazole (V) which is then dehydrated. This process may be illustrated by reaction scheme A as follows:

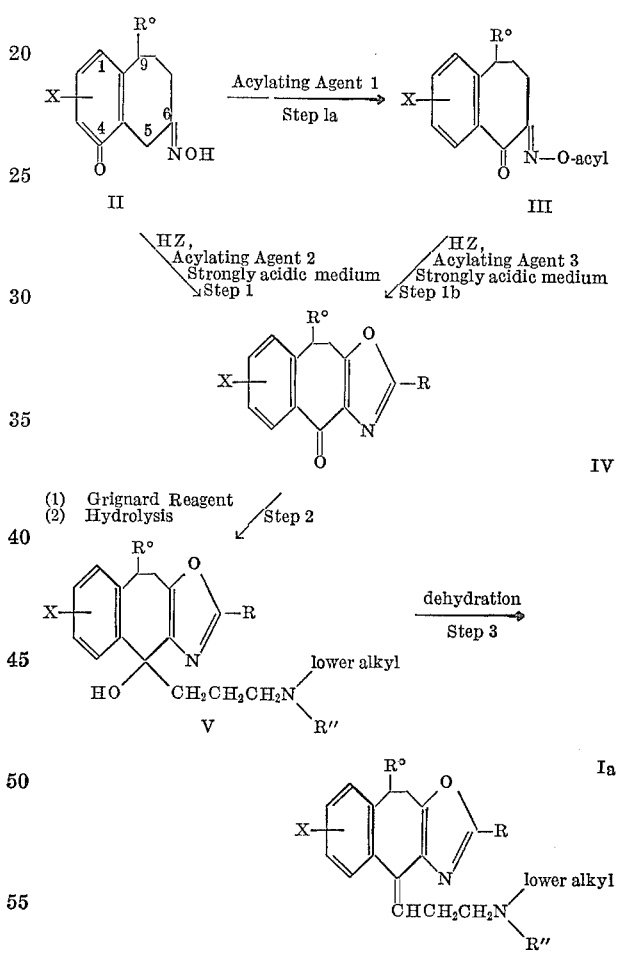

wherein R, R°, R", X and Z are as previously defined.

In Step 1 of the process, the 6-isonitroso-6,7,8,9-tetrahydro-5H-benzocyclohepten-5-one (II) is converted to the benzocycloheptaoxazol-4-one (IV) by treating with an appropriate acylating agent in the presence of an HZ acid. The choice of acylating agent is not critical and any acylating agent which is capable of converting an isonitroso group to an alkanolyloxyimino group can be used. For convenience, such agents are referred to herinafter as alkanoylating agents. For purposes of this invention the term "alkanoylating agent" is defined as an acylating agent which is capable of introducing an alkanoyl substituent into an organic compound. Suitable alkanoylating agents which may be employed include the lower alkanoic acids, e.g., acetic acid, propionic acid and butyric acid, the corresponding acid anhydrides thereof, e.g., acetic anhydride, propionic anhydride and butyric anhydride, mixtures of lower alkanoic acids and their corresponding anhydrides, e.g., acetic acid and acetic anhydride, propionic acid and propionic anhydride and butyric acid and butyric anhydride, lower alkanoyl halides, e.g., acetyl chloride, propionyl chloride and butyryl chloride, and mixtures of alkanoyl halides with the corresponding alkanoic acids and/or anhydrides such as mentioned above. Preferred alkanoylating agents are those having a

moiety; R being as defined above. The alkanoylating agent should be essentially water-free.

The HZ acid employed is preferably one wherein Z is a chlorine atom, i.e. hydrogen chloride. The acid may be added directly to the reaction mixture or formed in situ, e.g., from a suitable alkanoyl halide. The reaction can be carried out in an inert organic solvent if desired. However, the use of a solvent is not necessary since an excess of the acylating agent can be employed for this purpose. If a solvent is employed, the choice thereof is not critical and any inert organic solvent conventionally used with acylating agents of the type mentioned above can be employed, e.g., toluene or dioxane. Similarly, the temperature at which the reaction is effected is not critical. The particular temperature employed is for the most part dependent on the particular reactants used. In general, it is desirable to carry out the reaction at an elevated temperature of from about 60° C. to about 150° C. Preferably, the reaction is carried out at from 80° C. to about 110° C. The reaction is generally complete within several minutes to 3 hours depending upon the particular condition and reactants employed. In most instances, the resulting product separates as a solid, when the reaction mixture is poured over ice or diluted with water, and can be recovered by filtration and further purified by crystallization in conventional manner. When the product separates as an oil, it can be readily extracted with a suitable solvent, e.g., benzene, and further purified by conventional techniques.

Insofar as Step 1 of the process is concerned it is generally known that α-oximinoketones, if exposed to acid conditions, undergo the so-called second order Beckmann rearrangement, thereby leading to products where the original carbon-carbon bond, to which the keto and oximino moieties are attached, is ruptured. Although this occurs to a certain degree in Step 1 of the instant process it was quite surprising and certainly unexpected that the tricyclic ketone (IV) is obtained as the principle product.

As previously noted hereinabove, the tricyclic ketones (IV) may also be prepared by a two-step process which involves first the formation of the 6-alkanoyloxyimino derivative (III) by treatment of the 6-isonitroso starting material (II) with an acylating agent (Step 1a) and then obtainment of the desired tricyclic ketone (IV) by treatment of the intermediate 6-alkanoyloxyimino derivative (III) with a suitable acylating agent and HZ (Step 1b). The acylating agent and reaction conditions employed in Step 1a are the same as previously indicated for Step 1 except that reaction is carried out in the absence of the HZ acid. Similarly, conversion of the 6-alkanoyloxyimino derivative (III) to the desired tricyclic ketone (IV) by treatment of the former with acylating agent and HZ, is effected employing the same conditions with regard to solvent, temperatures and acid as indicated for Step 1. The moiety —H of the tricyclic ketone (IV) is determined by the —R moiety of the acylating agent used in Step 1 or 1b. The acylating agents 1, 2 and 3 used in Step 1, 1a, and 1b, respectively, may be the same or different, as desired. Preferably an excess of the alkanoylating agent is used, e.g., from in a molar excess of 2 to 20 fold over that required for the reaction.

With respect to Steps 1 and 1b, the reaction medium should be strongly acidic. Suitable acid should be used and in an amount so as to maintain strongly acidic conditions in the reaction mixture. Desirably, the reaction is carried out in the presence of at least 2 moles of HZ acid per mole of the starting material II or III, respectively. Preferably, from 2.5 to 3 moles of HZ acid per mole of reactant is employed. It is further desirable that the acidity of the reaction mixture is such that an aliquot portion thereof when diluted with water (1:10) gives a pH reading of not higher than 2 and preferably is in the range of from 0.5 to 1.5. Such acidic conditions may be provided wholly by the HZ acid or in part, supplemented by strong acid, e.g., mineral acid such as sulfuric acid.

In Step 2 of the process the tricyclic ketone (IV) is condensed with a metallo-dialkylaminopropyl halide Grignard reagent and the resulting Grignard adduct then hydrolyzed to form the corresponding carbinol (V). The preparation of the Grignard reagent, the condensation thereof with the tricyclic ketone and subsequent hydrolysis of the resulting Grignard adduct are all carried out in the same manner as has previously been described in the prior art for the preparation of the dibenzocycloheptene type of tricyclic compounds. Thus, the metallo-dialkylaminopropyl halides may be prepared by reaction of an appropriate metal with a dialkylaminopropyl halide in an appropriate solvent, such as diethyl ether or tetrahydrofuran. The preferred Grignard reagent is a dialkylaminopropylmagnesium halide, e.g., dimethylaminopropylmagnesium chloride. Similarly, condensation of the Grignard reagent with the tricyclic ketone is readily effected in an inert organic solvent, e.g., absolute diethyl ether, benzene and tetrahydrofuran. After the condensation has been effected, the Grignard adduct (condensate product) is hydrolytically decomposed under practically neutral conditions, e.g., by hydrolysis in aqueous ammonium chloride solution.

Dehydration of the carbinol (V) to the corresponding derivative (Ia), as indicated by Step 3, is likewise carried out in similar manner as that described in the prior art for the preparation of propylidene derivatives of dibenzocycloheptene from their corresponding carbinols. Thus, the dehydration step may be effected by heating with alcoholic hydrogen chloride. However, the numerous other reagents conventionally used for dehydrating similar carbinols of the dibenzocycloheptene type, e.g., phosphorus oxychloride, sulfuric acid and the like, may also be employed. Suitable inert organic solvents for use with dehydrating agents include glacial acetic acid, ethanol and xylene.

Compounds I wherein R' is hydrogen, i.e. compounds Ib, are prepared by N-dealkylation of the corresponding compound Ia according to the following procedure, i.e. reaction scheme B, wherein R, R°, R'' and X are as defined above:

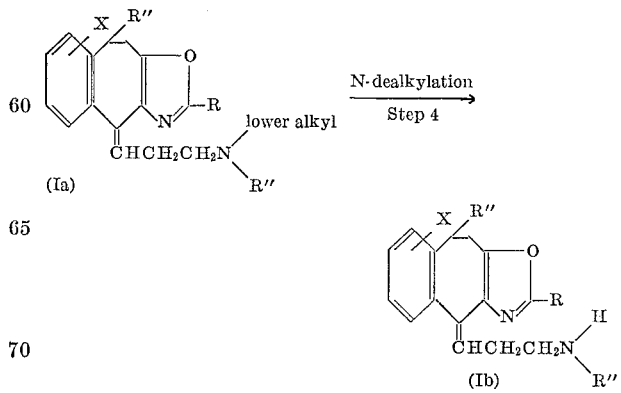

In reaction scheme B the N-dealkylation (Step 4) of compound Ia, i.e. a 4-(3-dialkylaminopropylidene)-2-lower alkyl - 9,10 - dihydro - 4H - benzo[5,6]cyclohepta

[1,2-d]oxazole, to the corresponding compound Ib, i.e. a 4-(3-monoalkylaminopropylidene)-2-lower alkyl-9,10-dihydro-4H-benzo[5,6]cyclohepta[1,2-d]oxazole, may be accomplished by conventional means. It is preferred to accomplish the N-dealkylation by first reacting the compound Ia with a lower linear alkyl chloroformate or bromoformate, e.g., having from 1 to 6 carbon atoms in the alkyl moiety, such as ethyl, by heating, e.g., at from 80° to 200° C., in a suitable solvent, e.g., toluene, to form the corresponding carbamate ester intermediate (compound VIa), which is then hydrolyzed and decarboxylated by heating, e.g., 90° to 180° C., in a strongly basic medium, e.g., in a solution of 5 to 15 wt. percent potassium or sodium hydroxide in n-butanol, to form the corresponding compound Ib. If desired, a von Braun N-dealkylation procedure can be employed for Step 4, e.g., by first converting a compound Ia to its cyano-derivative (compound VIb) by contacting a compound Ia with cyanogen bromide in a suitable solvent, e.g., absolute benzene, at 4° to 40° C., and then decomposing the cyano-derivative by heating, e.g., at 100° to 200° C., preferably refluxing, with an aqueous mineral acid, e.g., hydrochloric acid (5 to 10 wt. percent), preferably in a suitable solvent, e.g., glacial acetic acid.

The intermediates in the N-dealkylation (Step 4) may be represented structurally as follows (wherein X, R, R° and R" are as defined above):

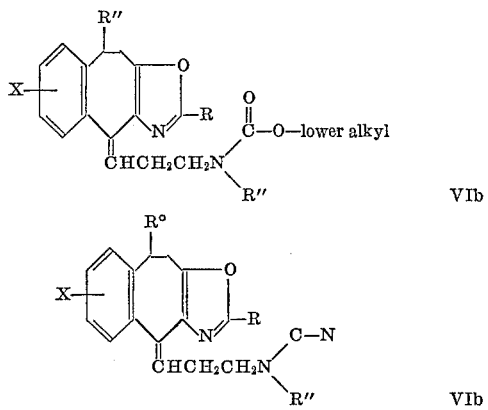

Compounds I have a double bond linking the mono- or dialkylaminopropylidene moiety to the 4-position of the tricyclic system. Hence, compounds I exist as geometric isomers, i.e. in cis and trans forms. Compounds V lack the double bond and therefore do not exist as geometrical isomers; but on dehydration (Step 3), a compound V yields the corresponding compound Ia as a mixture of geometric isomers. The mixture of isomers can be used directly as starting material for Step 4 (the N-dealkylation) or separation of isomers can be carried out and a material rich in one isomer used in Step 4 to yield a compound Ib having a corresponding isomeric make-up. The geometric isomers of compounds I can be separated by conventional means, e.g., by countercurrent distribution or by fractional crystallization of their salts, e.g., their acid fumarates, and are included in this invention.

In compounds I wherein R° is other than hydrogen, the 9-carbon atom of the tricyclic system is an asymmetric carbon atom. Hence, a compound I, wherein R° is phenyl can exist as a racemate or in an optically active form. The racemic form as well as the optical antipodes (enantiomers) are within the scope of this invention. Resolution of a racemate of a compound I can be effected by conventional means, e.g., the use of optically active acids. In some cases greater pharmacological activity or other beneficial attributes may be found with respect to a particular geometric and/or optical isomer, and in such instances administration of such isomer may be preferred.

Using an appropriate compound II and carrying out Step 1 or Step 1b in the manner described above, but using as the hydrohalic acid HQ (wherein Q is as defined below), a halogenated co-product (IVa) is obtained having the formula

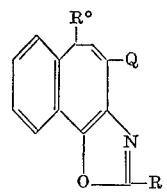

wherein R° and R are as defined above and Q is halo having an atomic weight of from 35 to 80, i.e. chloro or bromo depending on the HQ used.

In accordance with a further aspect of this invention there are provided compounds of Formula IVb

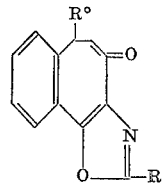

wherein R° and R are as defined above.

Compounds IVb are obtained by exposing an appropriate compound IV to the reaction conditions of Step 1 (or Step 1b) for a longer period (at least ten times the time necessary to form a compound IV in Step 1 or Step 1b). Alternatively, an appropriate compound IV may be converted into a corresponding compound IVb by contacting with strong mineral acid, e.g., concentrated hydrochloric acid or concentrated sulfuric acid, preferably at a pH of 1 or less.

Hence, compound IVb may be obtained either by continuing Step 1 or Step 1b to convert compound IV, to compound IVb. Or if desired, compound IV may be recovered from the reaction mixture and then treated with an appropriate acid to form the corresponding compound IVb.

In accordance with a still further aspect of this invention, compounds like those of Formula IV are prepared where R° and R are as designated previously and Y represents nitro or as defined above, and the procedure used is analogous to that described for Steps 1, 1a and 1b above, i.e. from compounds II' or III', which are compounds analogous to compounds II or III, respectively, having X— replaced by Y—, said terms having the above definitions. For convenience, all such like compounds are represented by Formula IV'

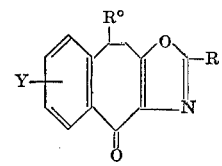

where R° and R are as defined above and Y is nitro or X, i.e. a hydrogen atom or halo, preferably chloro.

Any of compounds IV', IVa and IVb can be recovered from a reaction mixture containing one or more of said compounds by conventional means, e.g., fractional crystallization. Compounds IV' are generally insoluble in ether, in which case they may be readily separated from co-product by ether-washing.

The compounds of Formulae I, IV', IVa and IVb are useful because they possess pharmacological activity in animals. In particular, compounds of Formula I possess tranquilizing activity and can be used as psychotherapeutic agents in the same manner as chlorpromazine, a known psychotherapeutic drug. Thus the compounds, in either their free base form or in the form of acid addition salts, e.g., hydrochloride, hydrobromide, sulfate, phosphate, oxalate, acetate, citrate, tartrate, p-toluenesulfonate and the like, may be admixed with conventional pharmaceutical carriers or diluents and administered internally in the same manner as chlorpromazine. The daily dosage administered is likewise of the same order as that for chlorpromazine and appropriate dosage forms can be prepared accordingly.

The compounds of Formula IV′ are useful as antiinflammatories as indicated by the carageenan-induced edema test on the white rat paw. For such use the compounds may be admixed with conventional pharmaceutical carriers or diluents and administered internally in the form of tablets, capsules, elixirs, solutions or suspensions. The dosage administered will, of course, vary depending upon the compound employed, mode of administration and treatment desired. However, in general, satisfactory results are obtained when administered at a daily dosage of from 5 milligrams per kilogram to 50 milligrams per kilogram of body weight preferably given in divided doses 2 to 4 times a day or in sustained release form. For the larger mammals as well as the smaller domestic mammals, dosage forms suitable for internal administration comprise from about 25 milligrams to about 500 milligrams of the compound admixed with a solid or liquid pharmaceutical carrier or diluent.

The compounds of Formula IVa are useful as antidepressants, as indicated by the delayed dihydroxyphenylalanine potentiation test in white mice (described in Fed. Proc. 23, 198, 1964), i.e. the DOPA test.

The compounds of Formula IVb are useful as diuretics as indicated by the method of Roy Aston on the unanesthetized white rat (Toxicol. and Appl. Pharm., 1:277, 1959).

For the above-described uses, compounds IVa and IVb are administered in the manner described above for compounds of Formula IV′ in daily dosages of from 25 milligrams per kilogram to 100 milligrams per kilogram of body weight for small mammals and from 75 milligrams to 400 milligrams for large mammals, preferably given in divided doses 2 to 4 times a day or in sustained release form.

A representative formulation is a tablet (prepared by standard tabletting procedures) and containing the following ingredients:

| Ingredient: | Parts by weight |
|---|---|
| 2-methyl-9,10-dihydro-4H-benzo[5,6]cyclohepta[1,2-d]oxazol-4-one | 50 |
| Tragacanth | 2 |
| Lactose | 39.5 |
| Corn starch | 5 |
| Talcum | 3 |
| Magnesium stearate | 0.5 |

The compounds (II′) employed as starting materials in the process described hereinabove may be prepared by nitrosation of 6,7,8,9-tetrahydro-5H-benzocyclohepten-5-one or an appropriately substituted derivative thereof as illustrated by the following reaction scheme:

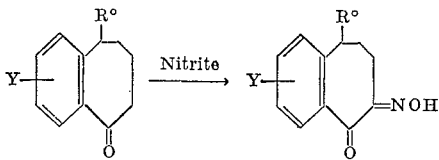

wherein R° and Y are as previously defined.

The above reaction is conveniently effected in conventional manner employing an appropriate inert organic solvent, e.g., benzene, toluene and diethyl ether, and a nitrite, preferably a lower alkyl nitrite such as ethyl nitrite, butyl nitrite or amyl nitrite. Preferably the reaction is carried out at room temperature (20° C.) or below and in the presence of a strong anhydrous acid or base, such as hydrochloric acid or sodium methoxide, respectively.

The 6,7,8,9 - tetrahydro - 5H - benzocyclohepten - 5-ones employed above are either known and can be prepared as described in the literature or they can be prepared from available materials in analogous manner to that described in the literature for the preparation of the known compounds.

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

EXAMPLE 1

4 - (3 - dimethylaminopropylidene) - 2 - methyl - 9,10-dihydro - 4H - benzo[5,6]cyclohepta[1,2-d]oxazole. (Mixture of cis and trans)

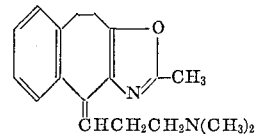

Step A. Preparation of 6-isonitrose-6,7,8,9-tetrahydro-5H-benzocyclohepten-5-one.—To a solution of 50 g. of 6,7,8,9 - tetrahydro - 5H - benzocyclohepten - 5 - one in 210 ml. of 0.35 N absolute ethereal hydrochloric acid is added, over a period of 15 minutes, 32.2 g. of n-butyl nitrite while maintaining the temperature of the reaction mixture between 15–20° C. (by external cooling). After crystallization commences petroleum ether is added and the resulting crystalline material filtered off and washed with petroleum ether to obtain 6-isonitroso-6,7,8,9-tetrahydro-5H-benzocyclohepten-5-one, M.P. 139–141° C.

Step B. Preparation of 2-methyl-9,10-dihydro-4H-benzo[5,6]cyclohepta[1,2-d]oxazol-4-one.—Hydrogen chloride gas is passed through a mixture of 45 ml. of glacial acetic acid and 7.8 ml. of acetic anhydride for 15 minutes while maintaining the temperature of the mixture at 100° C. Thereafter 2.997 g. of 6-isonitroso-6,7,8,9-tetrahydro-5H-benzocyclohepten-5-one is immediately added while continuing the passage of hydrogen chloride gas through the mixture and maintaining the reaction temperature at 100° C. during the addition of the ketone and for an additional 15 minutes thereafter. The resulting mixture is then poured over ice containing 45 g. of sodium carbonate. The resulting solids are then recovered by filtration, washed first with water and then with small amounts of ethyl acetate and then dried to obtain 2-methyl-9,10-dihydro-4H-benzo[5,6]cyclohepta[1,2 - d]oxazol-4-one, M.P. 174–176° C.

Step C. Preparation of 4-(3-dimethylaminopropyl)-4-hydroxy - 2 - methyl - 9,10 - dihydro - 4H - benzo[5,6]cyclohepta[1,2-d]oxazole.—To a Grignard mixture, prepared in conventional manner by reacting 1.27 g. of magnesium with 6.45 g. of 3-dimethylaminopropyl chloride in 26.6 ml. of tetrahydrofuran at 0° C., is added 5.141 g. of 2 - methyl - 9 ,10 - dihydro - 4H - benzo[5,6]cyclohepta[1,2-d]oxazol-4-one. The resulting solution is maintained at 0° C. for 1 hour and then 5 ml. of a saturated ammonium chloride solution is added. The organic layer is separated and the aqueous phase repeatedly extracted with ethyl acetate. The combined organic layers are then dried over sodium sulfate and evaporated to dryness. The residue is extracted with petroleum ether and the ether then evaporated off to obtain 4 - (3 - dimethylaminopropyl) - 4 - hydroxy - 2 - methyl - 9,10 - dihydro - 4H-benzo[5,6]cyclohepta[1,2-d]oxazole, M.P. 67–68° C.

Step D. Preparation of 4 - (3 - dimethylaminopropylidene) - 2 - methyl - 9,10 - dihydro - 4H - benzo[5,6]cyclohepta[1,2-d]oxazole.—A solution of 5.33 g. of 4-(3-dimethylaminopropyl) - 4 - hydroxy - 2 - methyl - 9,10- dihydro - 4H - benzo[5,6]cyclohepta[1,2-d]oxazole in 107 ml. of 4.52 N ethanolic hydrochloric acid is heated under reflux for 45 minutes and then evaporated to dryness. The residue is dissolved in water and the resulting solution made strongly basic with sodium hydroxide and then extracted with diethyl ether. Evaporation of the dried ethereal solution yields an oily mixture of cis and trans 4 - (3 - dimethylaminopropylidene) - 2 - methyl - 9,10-dihydro - 4H - benzo[5,6]cyclohepta[1,2-d]oxazole, which is characterized by its NMR spectrum (60 megahertz, CDCl₃ solution) vinyl protons:

|  | P.p.m. |
|---|---|
| Cis isomer | δ6.32 |
| Trans isomer | δ5.83 |

EXAMPLE 2

4 - (3 - dimethylaminopropylidene) - 2 - methyl - 9-phenyl - 9,10 - dihydro - 4H - benzo[5,6]cyclohepta[1,2-d]oxazole. (Mixture of cis and trans)

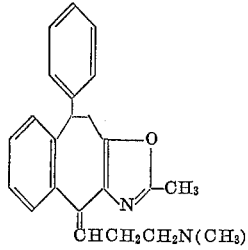

Step A. Preparation of 6 - isonitroso - 9 - phenyl-6,7,8,9 - tetrahydro -5H - benzocyclohepten - 5 - one.— Following the procedure of Step A of Example 1 and employing an equivalent amount of 9 - phenyl - 6,7,8,9-tetrahydro -5H - benzocyclohepten - 5 - one in place of the 6,7,8,9 - tetrahydro - 5H - benzocyclohepten - 5 - one used therein, there is obtained 6 - isonitroso - 9 - phenyl-6,7,8,9 - tetrahydro - 5H - benzocyclohepten - 5 - one, M.P. 176° C.

Step B. Preparation of 2 - methyl - 9 - phenyl - 9,10-dihydro - 4H - benzo[5,6]cyclohepta[1,2-d]oxazol - 4-one.—Following the procedure of Step B of Example 1 and employing an equivalent amount of 6 - isonitroso-9-phenyl - 6,7,8,9 - tetrahydro - 5H - benzocyclohepten-5-one in place of the 6 - isonitroso - 6,7,8,9 - tetrahydro-5H - benzocyclohepten - 5 - one used therein, there is obtained 2 - methyl - 9 - phenyl - 9,10 - dihydro - 4H-benzo[5,6]cyclohepta[1,2-d]oxazol - 4 - one, M.P. 192–193.5° C.

Step C. Preparation of 4-(3-dimethylaminopropyl)-4-hydroxy - 2 - methyl - 9 - phenyl - 9,10 - dihydro - 4H-benzo[5,6]cyclohepta[1,2-d]oxazole.—Following the procedure of Step C of Example 1 and employing an equivalent amount of 2-methyl-9-phenyl-9,10-dihydro-4H-benzo[5,6]cyclohepta[1,2-d]oxazol - 4 - one in place of the 2 - methyl - 9,10 - dihydro - 4H - benzo[5,6]cyclohepta[1,2-d]oxazol - 4 - one used therein, there is obtained 4-(3-dimethylaminopropyl) - 4 - hydroxy - 2 - methyl - 9-phenyl - 9,10 - dihydro - 4H - benzo[5,6]cyclohepta[1,2-d]oxazole as an oil, which is used without further purification in Step D below.

Step D. Preparation of 4 - (3 - dimethylaminopropylidene) - 2 - methyl - 9 - phenyl - 9,10 - dihydro - 4H-benzo[5,6]cyclohepta[1,2-d]oxazole.—Following the procedure of Step D of Example 1 and employing an equivalent amount of 4 - (3 - dimethylaminopropyl) - 4 - hydroxy - 2 - methyl - 9 - phenyl - 9,10-dihydro - 4H - benzo[5,6]cyclohepta[1,2-d]oxazole used therein, there is obtained 4 - (3 - dimethylaminopropylidene) - 2 - methyl - 9 - phenyl - 9,10 - dihydro - 4H-benzo[5,6]cyclohepta[1,2-d]oxazole, as a mixture of cis and trans isomers which is characterized by its NMR spectrum (60 megaherzt CDCl₃ solution) vinyl protons: cis isomer; broad singlet centered at δ6.23 p.p.m. trans isomer; triplet centered at δ5.79 p.p.m.

EXAMPLE 3

2-methyl-9,10-dihydro-4H-benzo[5,6]cyclohepta[1,2-d] oxazol-4-one (alternative process)

Step A. Preparation of 6-acetoxyimino-6,7,8,9-tetrahydro-5H-benzocyclohepten-5-one.—To a mixture containing 160 ml. of glacial acetic acid and 30 ml. of acetic anhydride is added 15 g. of 6-isonitroso-6,7,8,9-tetrahydro-5H-benzocyclohepten-5-one while maintaining the temperature of the reaction mixture at 110° C. After 15 minutes the mixture is poured over ice, the resulting solids filtered off and washed with water and then dried at room temperature to obtain 6-acetoxyimino-6,7,8,9-tetrahydro-5H-benzocyclohepten-5-one, M.P. 93–95° C.

Step B. Preparation of 2-methyl-9,10-dihydro-4H-benzo [5,6]cyclohepta[1,2-d]oxazol-4-one.—Hydrogen chloride gas is passed through a mixture of 160 ml. of glacial acetic acid and 30 ml. of acetic anhydride for 15 minutes while maintaining the temperature of the mixture at 100° C. Thereafter 13.2 g. of 6-acetoxyimino-6,7,8,9-tetrahydro-5H-benzocyclohepten-5-one is immediately added while continuing the passage of hydrogen chloride gas through the mixture and maintaining the reaction temperature at 100° C. during the addition of the ketone and for an additional 15 minutes thereafter. The resulting mixture is then poured over ice containing 100 g. of sodium carbonate. The resulting solids are then recovered by filtration, washed first with water and then with small amounts of ethyl acetate and then dried to obtain 2-methyl-9,10-dihydro-4H-benzo[5,6]cyclohepta[1,2-d]oxazol - 4 - one, M.P. 176–177° C.

EXAMPLE 4

8 - chloro-4-(3-dimethylaminopropylidene)-2-methyl-9,10-dihydro - 4H - benzo[5,6]cyclohepta[1,2 - d]oxazole (mixture of cis and trans)

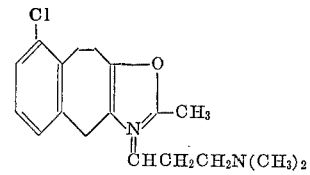

Step A. Preparation of 1-chloro-6,7,8,9-tetrahydro-5H-benzocyclohepten-5-one.—Into a mixture of 222 g. of 6,7,8,9 - tetrahydro - 5H - benzocyclohepten - 5 - one, 442.4 g. of anhydrous aluminum chloride and 500 ml. of 1,1,2,2-tetrachloroethane, stirred at 25° C., there is introduced, over a period of 4 hours, 130 g. of chlorine. Then the mixture is poured onto a mixture consisting of 4 kg. of ice and 550 ml. of 11 N hydrochloric acid. The organic phase is separated and the aqueous phase is extracted thrice with 100 ml. portions of chloroform. The organic phases are combined and washed twice with 200 ml. portions of 2 N hydrochloric acid, washed thrice with 200 ml. portions of water, dried over sodium sulfate and evaporated to give an oil, which is then fractionated on a spinning band column to give the following products:

(a) 1 - chloro - 6,7,8,9 - tetrahydro - 5H - benzocyclohepten-5-one: B.P. 130–131° C./2.7 mm.; $n_D^{20}$ =1.5764; oxime, M.P. 136–138° C.; and (b) 3 - chloro - 6,7,8,9 - tetrahydro - 5H - benzocyclohepten - 5 - one: B.P. 143–146° C./2.9 mm.; M.P. 36–40° C.; oxime, M.P. 138–142° C.

Step B. Preparation of 1 - chloro - 6 - isonitroso - 6,7, 8,9-tetrahydro - 5H - benzocyclohepten - 5 - one.—Following the procedure of Step A of Example 1 and employing an equivalent amount of 1-chloro-6,7,8,9-tetrahydro-5H - benzocyclohepten - 5 - one in place of the 6,7,8,9-tetrahydro - 5H - benzocyclohepten - 5 - one used therein, there is obtained 1-chloro-6-isonitroso-6,7,8,9-tetrahydro- 5H-benzocyclohepten-5-one, M.P. 174–175° C. (from diethyl ether-petroleum ether; 1:1).

Step C. Preparation of 8-chloro-2-methyl-9,10-dihydro-4H - benzo[5,6]cyclohepta[1,2-d]oxazol-4-one.—Following the procedure of Step B of Example 1 and employing an equivalent amount of 1-chloro-6-isonitroso-6,7,8,9-tetrahydro-5H-benzocyclohepten-5-one in place of the 6-isonitroso - 6,7,8,9 - tetrahydro-5H-benzocyclohepten-5-one used therein, there is obtained 8 - chloro-2-methyl-9,10 - dihydro - 4H-benzo[5,6]cyclohepta[1,2-d]oxazol-4-one, M.P. 125–126° C.

Step D. Preparation of 8-chloro-4-(3-dimethylaminopropyl) - 4 - hydroxy-2-methyl-9,10-dihydro-4H-benzo[5,6]cyclohepta[1,2-d]oxazole.—Following the procedure of Step C of Example 1 and employing an equivalent amount of 8 - chloro - 2 - methyl-9,10-dihydro-4H-benzo[5,6]cyclohepta[1,2-d]oxazol-4-one in place of the 2-methyl - 9,10-dihydro-4H-benzo[5,6]cyclohepta[1,2-d]-oxazol-4-one used therein, there is obtained 8-chloro-4-(3 - dimethylaminopropyl) - 4-hydroxy-2-methyl-9,10-dihydro-4H-benzo[5,6]cyclohepta[1,2-d]oxazole.

Step E. Preparation of 8-chloro-4-(3-dimethylaminopropylidene) - 2 - methyl-9,10-dihydro-4H-benzo[5,6]cyclohepta[1,2-d]oxazole.—Following the procedure of Step D of Example 1 and employing an equivalent amount of 8 - chloro - 4-(3-dimethylaminopropyl)-4-hydroxy-2-methyl - 9,10 - dihydro-4H-benzo[5,6]cyclohepta[1,2-d]oxazole in place of the 4-(3-dimethylaminopropyl)-4-hydroxy - 2 - methyl-9,10-dihydro-4H-benzo[5,6]cyclohepta[1,2-d]oxazole used therein, there is obtained 8-chloro-4 - (3-dimethylaminopropylidene)-2-methyl-9,10-dihydro-4H-benzo[5,6]cyclohepta[1,2-d]oxazole as a mixture of cis and trans isomers, which is characterized by its NMR spectrum (60 megahertz, CDCl$_3$ solution)

vinyl protons:
(1) cis isomer; triplet centered at δ6.34 p.p.m.
(2) trans isomer; triplet centered at δ5.87 p.p.m.

EXAMPLE 5

6 - chloro - 4-(3-dimethylaminopropylidene)-2-methyl-9,10 - dihydro-4H-benzo[5,6]cyclohepta[1,2-d]oxazole (mixture of cis and trans)

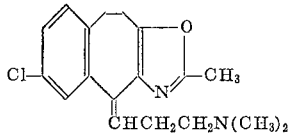

Step A. Preparation of 3-chloro-6-isonitroso-6,7,8,9-tetrahydro-5H-benzo-cyclohepten-5-one.—Following the procedure of Step A of Example 1 and employing an equivalent amount of 3 - chloro-6,7,8,9-tetrahydro-5H-benzocyclohepten-5-one (obtained as described in Step A of Example 4) in place of the 6,7,8,9 - tetrahydro-5H-benzocyclohepten-5-one used therein, there is obtained 3-chloro - 6 - isonitroso-6,7,8,9-tetrahydro-5H-benzocyclohepten-5-one, M.P. 184–186° C.

Step B. Preparation of 6-chloro-2-methyl-9,10-dihydro-4H - benzo[5,6]cyclohepta[1,2-d]oxazol-4-one.—Following the procedure of Step B of Example 1 and employing an equivalent amount of 3-chloro-6-isonitroso-6,7,8,9-tetrahydro-5H-benzocyclohepten-5-one in place of the 6-isonitroso - 6,7,8,9 - tetrahydro-5H-benzocyclohepten-5-one used therein, there is obtained 6-chloro-2-methyl-9,10-dihydro - 4H - benzo[5,6]cyclohepta[1,2-d]oxazol-4-one, M.P. 198–199° C.

Step C. Preparation of 6-chloro-4-(3-dimethylaminopropyl)-4-hydroxy-2-methyl-9,10-dihydro-4H-benzo[5,6]cyclohepta[1,2-d]oxazole.—Following the procedure of Step C of Example 1 and employing an equivalent amount of 6 - chloro-2-methyl-9,10-dihydro-4H-benzo[5,6]cyclohepta[1,2-d]oxazol-4-one in place of the 2-methyl-9,10-dihydro - 4H - benzo[5,6]cyclohepta[1,2 - d]ozaxol-4-one used therein, there is obtained 6-chloro-4-(3-dimethylaminopropyl)-4-hydroxy - 2 - methyl-9,10-dihydro-4H-benzo[5,6]cyclohepta[1,2-d]ozaxole.

Step D. Preparation of 6-chloro-4-(3-dimethylaminopropylidene)-2-methyl-9,10-dihydro-4H-benzo[5,6]cyclohepta[1,2-d]oxazole.—Following the procedure of Step D of Example 1 and employing an equivalent amount of 6-chloro-4-(3 - dimethylaminopropyl)-4-hydroxy-2-methyl-9,10-dihydro-4H-benzo[5,6]cyclohepta[1,2 - d]oxazole in place of the 4-(3-dimethylaminopropyl)-4-hydroxy-2-methyl-9,10-dihydro - 4H - benzo[5,6]cyclohepta[1,2-d] oxazole used therein, there is obtained 6-chloro-4-(3-dimethylaminopropylidene) - 2 - methyl-9,10-dihydro-4H-benzo[5,6]cyclohepta[1,2-d]oxazole as a mixture of cis and trans isomers, which is characterized by its NMR spectrum (60 megahertz, CDCl$_3$ solution)

vinyl protons:
(1) cis isomer; triplet centered at δ6.40 p.p.m.
(2) trans isomer; triplet centered at δ5.88 p.p.m.

EXAMPLE 6

4-(3-dimethylaminopropylidene) - 2 - ethyl-9,10-dihydro-4H-benzo[5,6]cyclohepta[1,2 - d]oxazole (mixture of cis and trans)

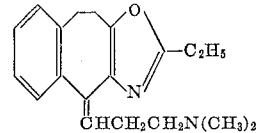

Step A. Preparation of 2-ethyl-9,10-dihydro-4H-benzo-[5,6]cyclohepta[1,2-d]oxazol-4-one.—Following the procedure of Step B of Example 1 and employing an equivalent amount of propionic acid and propionic anhydride in place of the glacial acetic acid and acetic anhydride, respectively, used therein, there is obtained 2-ethyl-9,10-dihydro - 4H - benzo[5,6]cyclohepta[1,2-d]oxazol-4-one, M.P. 123–124° C.

Step B. Preparation of 4-(3-dimethylaminopropyl)-2-ethyl - 4-hydroxy-9,10-dihydro-4H-benzo[5,6]cyclohepta-[1,2-d]oxazole.—Following the procedure of Step C of Example 1 and employing an equivalent amount of 2-ethyl-9,10-dihydro - 4H - benzo[5,6]cyclohepta[1,2 - d] oxazol-4-one in place of the 2-methyl-9,10-dihydro-4H-benzo[5,6]cyclohepta[1,2 - d]oxazol-4-one used therein, there is obtained 4-(3-dimethylaminopropyl)-2-ethyl-4-hydroxy-9,10-dihydro - 4H - benzo[5,6]cyclohepta[1,2 - d] oxazole.

Step C. Preparation of 4-(3-dimethylaminopropylidene)-2-ethyl-9,10-dihydro - 4H - benzo[5,6]cyclohepta-[1,2-d]oxazole.—Following the procedure of Step D of Example 1 and employing an equivalent amount of 4-(3-dimethylaminopropyl)-2-ethyl-4-hydroxy-9,10-dihydro-4H-benzo[5,6]cyclohepta[1,2-d]oxazole in place of the 4 - (3-dimethylaminopropyl)-4-hydroxy-2-methyl-9,10-dihydro-4H-benzo[5,6]cyclohepta[1,2-d]oxazole used therein, there is obtained 4-(3-dimethylaminopropylidene)-2-ethyl-9,10-dihydro-4H-benzo[5,6]cyclohepta[1,2 - d]oxazole as a mixture of cis and trans isomers, which is characterized by its NMR spectrum (60 megahertz, CDCl$_3$ solution)

vinyl protons:
(1) cis isomer; triplet centered at δ6.37 p.p.m.
(2) trans isomer; triplet centered at δ5.82 p.p.m.

EXAMPLE 7

2 - methyl - 4 - (3 - methylaminopropylidene) - 9,10-dihydro - 4H - benzo[5,6]cyclohepta[1,2 - d]oxazole (mixtures of cis and trans isomers)

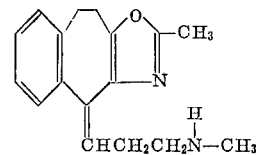

A mixture of 8.05 g. of 4-(3-dimethylaminopropylidene) - 2 - methyl - 9,10 - dihydro - 4H - benzo[5,6] cyclohepta[1,2-d]oxazole; cis and trans isomer mixture (obtained as described in Example 1); 4.82 g. of ethyl chlorocarbonate and 40 ml. of toluene is refluxed for 24 hours. The solution is cooled to room temperature and any unchanged starting material is removed by subsequent extraction with 10 ml. portions of 2 N hydrochloric acid. The toluene solution is then washed with water, dried over sodium sulfate and evaporated to obtain the intermediate, i.e. 4 - (3 - carbethoxy - 3 - methylaminopylidene) - 2 - methyl - 9,10 - dihydro - 4H - benzo[5,6]cyclohepta[1,2-d]oxazole as a residue. The mass of intermediate so obtained is heated under reflux for 18 hours, under a nitrogen atmosphere, with a mixture of 6.7 g. of potassium hydroxide and 65 ml. of n-butanol. After vacuum evaporation to 5 g., the residue is taken up in 80 ml. of benzene and 80 ml. of water and the benzene layer is washed several times with water; then, the benzene layer is extracted six times with 20 ml. of 2 N hydrochloric acid. This acid aqueous solution is made strongly basic (pH 12 to 14) by the addition of potassium hydroxide and exhaustively extracted with methylene chloride. The dried methylene chloride solution is evaporated to obtain the product as an oil, which is then purified by vacuum distillation (130° bath temperature, 0.001 mm. pressure).

The product is a mixture of trans and cis isomers of the title compound, which is characterized by its NMR spectrum (60 megahertz, CDCl₃ solution, tetramethylsilane as internal standard);

cis: vinyl proton; triplet centered at δ6.34 p.p.m.;
trans: vinyl proton; triplet centered at δ5.82 p.p.m.

EXAMPLE 8

2 - methyl - 4 - (3 - methylaminopropylidene) - 9,10- dihydro - 4H - benzo[5,6]cyclohepta[1,2 - d]oxazole (mixture of cis and trans; alternative process)

Step A. Preparation of 4-(3-cyano-3-methylaminopropylidene)-2-methyl - 9,10 - dihydro - 4H - benzo[5,6] cyclohepta[1,2-d]oxazole.—A solution of 7.8 g. of cyanogen bromide in 30 ml. of absolute benzene is added, dropwise at room temperature, to a solution of 15.0 g. of 4-(3-dimethylaminopropylidene - 2 - methyl - 9,10 - dihydro-4H-benzo[5,6]cyclohepta[1,2-d]oxazole in 40 ml. of absolute benzene, the mixture allowed to stand at 20° C. for 12 hours and then evaporated under vacuum to dryness to obtain a residue. The residue is triturated with 100 ml. of diethyl ether, the resulting mixture filtered and the filtrate evaporated to dryness to obtain 4-(3 - cyano - 3- methylaminopropylidene) - 2 methyl - 9,10 - dihydro - 4H- benzo[5,6]cyclohepta[1,2-d]oxazole.

Step B. Preparation of 2-methyl-4-(3-methylamino propylidene) - 9,10 - dihydro - 4H - benzo[5,6]cyclohepta [1,2-d]oxazole (mixture of cis and trans; alternative process).—9.2 g. of 4-(3-cyano-3-methyl-aminopropylidene)- 2 - methyl - 9,10 - dihydro - 4H - benzo[5,6]cyclohepta [1,2-d]oxazole (obtainable according to the procedure described above in Step A) is mixed with 22 ml. of glacial acetic acid, 22 ml. of 11 N hydrochloric acid and 146 ml. of water and the mixture heated under reflux for 4 hours. The reaction mixture is then evaporated under vacuum to obtain a residue. The residue is made basic (to pH 12 to 14) with 25% aqueous potassium hydroxide, extracted thrice with 50 ml. portions of benzene, the extracts combined, dried over sodium sulfate and evaporate under vacuum to yield 2-methyl-4-(3-methylaminopropylidene)- 9,10-dihydro - 4H - benzo[5,6]cyclohepta[1,2-d]oxazole as a mixture of cis and trans isomers.

EXAMPLE 9

2-methyl-9,10-dihydro-4H-benzo[5,6]cyclohepta[1,2-d] oxazol-4-one (alternative process)

To a mixture of 4200 ml. of glacial acetic and 440 ml. of acetic anhydride, kept at 70° C. there is added, in 10 minutes, 378 g. of 6-isonitroso-6,7,8,9-tetrahydro - 5H- benzocyclohepten-5-one and the resulting solution is stirred at 75–85° C. for 15 minutes. Thereafter, over 30 minutes, 600 ml. of acetyl chloride is dropped in, the temperature being maintained at 85° C. After additional 50 minutes at that temperature, cooling is applied. At 30° C., 700 g. of anhydrous sodium acetate is added in a rate, that the temperature does not exceed 50° C. The mixture is then evaporated in vacuo to about 1500 g. of residue, which is then taken up in 5 liters of benzene and 2 liters of water. The aqueous phase is separated and the benzene phase is washed 3 times with 3-liter portions of 2 N sodium hydroxide solution, then 3 times with 1-liter portions of water. The benzene solution is dried over sodium sulfate and then evaporated to dryness to give a neutral residue. The residue is stirred with 1500 ml. of ether, first at 20° C., then at 10° C., whereupon the title product (M.P. 174–176° C.), crystallizes and is separated by filtration.

EXAMPLE 10

2-methyl-4-chloro-6H-benzo[3,4]cyclohepta[1,2-d] ozazole

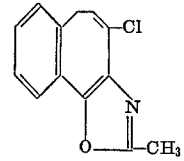

The organic wash or the ethereal solution obtained as the mother liquor in the purification or crystallization of 2 - methyl - 9,10 - dihydro - 4H - benzo[5,6]cyclohepta [1,2-d] oxazol-4-one (Example 1, Step B, Example 3 or Example 9 above), is evaporated to dryness to give a slowly crystallizing dark oil. This oil is distilled at 135– 140°/0.1 mm. to give the title product as a viscous oil, which crystallizes on standing. The product is then stirred with ethyl acetate-hexane (1:5) yielding filtrable crystals, M.P. 88–89° C.

EXAMPLE 11

2-methyl-5,6-dihydro-4H-benzo[3,4]cyclohepta[1,2-d] oxazol-4-one

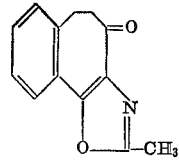

A mixture of 18 g. of 2 - methyl - 9,10 - dihydro - 4H- benzo[5,6]cyclohepta[1,2-d]oxazol - 4 -one (obtainable as described in Example 1b, Example 3 or Example 9) and 267 ml. of 11 normal hydrochloric acid heated under reflux for 60 minutes. After cooling, the mixture is concentrated in vacuo to about 50 g., diluted with 300 ml. of water and extracted 3 times with 30-ml. portions of chloroform. The combined chloroform extract is dried over sodium sulfate, and then evaporated to obtain a residue which, on trituration with 30 ml. of ether, crystallizes. Filtration yields the title product as a pale yellow solid, M.P. 112–113° C.

EXAMPLE 12

2-methyl-6-nitro-9,10-dihydro-4H-benzo[5,6]cyclohepta[1,2-d]oxazol-4-one

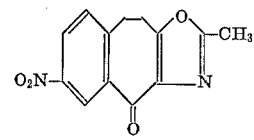

Following the procedure of Steps A and B of Example 1 and employing as starting material an equivalent amount of 3-nitro-6,7,8,9-tetrahydro-5H-benzocyclohepten-5-one in place of the 6,7,8,9-tetrahydro-5H-benzocyclohepten-5-one used therein, there is obtained 2-methyl-6-nitro - 9,10 - dihydro-4H-benzo[5,6]cyclohepta[1,2-d]oxazol-4-one, M.P. 219° to 220° C.

What is claimed is:
1. A compound of the formula

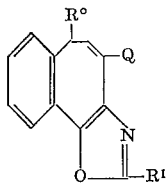

wherein $R^1$ represents lower alkyl
$R°$ represents hydrogen or phenyl; and
Q represents a halogen atom having an atomic weight of from 35 to 80.

2. A compound of claim 1 wherein Q represents chloro.
3. The compound of claim 2 which is 2-methyl-4-chloro-6H-benzo[3,4]cyclohepta[1,2-d]oxazole.
4. A compound of the formula

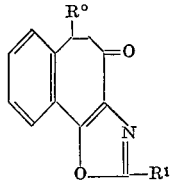

wherein $R^1$ represents lower alkyl; and
$R°$ represents hydrogen or phenyl.

5. The compound of claim 4 which is 2-methyl-5,6-dihydro-4H-benzo[3,4]cyclohepta[1,2-d]oxazol-4-one.
6. A process for preparing a compound of claim 1 which comprises reacting a compound of the formula

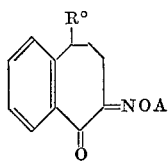

wherein $R°$ represents hydrogen or phenyl; and
A represents hydrogen or an acyl function of the formula

wherein $R^2$ represents lower alkyl with an alkanoylating agent having a function of the formula

wherein $R^1$ represents lower alkyl and in the presence of a hydrohalic acid of the formula HQ wherein Q represents a halogen atom having an atomic weight of from 35 to 80 in a strongly acidic medium.

7. A process of claim 6 wherein A is a hydrogen atom.
8. A process of claim 7 wherein Q is chlorine.
9. A process of claim 7 wherein the alkanoylating agents are a mixture of lower alkanoic acid and its corresponding anhydride.
10. A process of claim 8 wherein the reaction is carried out at a temperature of from about 60° C. to about 150° C.
11. A process of claim 8 wherein the reaction is carried out at a temperature of from about 80° C. to about 110° C.
12. A process according to claim 6 wherein A is acyl.
13. A process of claim 12 wherein Q is chlorine.
14. A process of claim 12 wherein the alkanoylating agents are a mixture of lower alkanoic acid and its corresponding anhydride.
15. A process of claim 12 wherein $R^1$ is $R^2$.
16. A process of claim 13 wherein the reaction is carried out at a temperature of from about 60° C. to about 150° C.
17. A process of claim 13 wherein the reaction is carried out at a temperature of from about 80° C. to about 110° C.
18. A process for preparing a compound of claim 4 which comprises contacting a compound of the formula

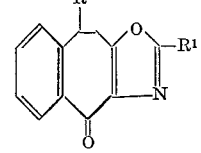

wherein $R^1$ represents lower alkyl; and
$R°$ represents hydrogen or phenyl with a strong mineral acid.

19. A process of claim 18 wherein the mineral acid is concentrated hydrochloric acid.

References Cited

UNITED STATES PATENTS 3,198,805  8/1965  Muller et al. _____ 260—307
3,478,048  11/1969  Edenhofer et al. _____ 260—307

ALTON D. ROLLINS, Primary Examiner